(12) United States Patent
Ikunami

(10) Patent No.: US 7,606,473 B2
(45) Date of Patent: Oct. 20, 2009

(54) IMAGE REPRODUCING DEVICE

(75) Inventor: Takahiro Ikunami, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1033 days.

(21) Appl. No.: 10/895,123

(22) Filed: Jul. 21, 2004

(65) Prior Publication Data

US 2005/0031317 A1 Feb. 10, 2005

(30) Foreign Application Priority Data

Aug. 7, 2003 (JP) ............................. 2003-289127

(51) Int. Cl.
*H04N 5/76* (2006.01)
*H04N 7/00* (2006.01)
*H04N 5/00* (2006.01)

(52) U.S. Cl. ........................................ 386/125; 386/46

(58) Field of Classification Search ................ 386/1, 386/45–46, 125–126, 95–96; 348/838, 837
See application file for complete search history.

(56) References Cited

U.S. PATENT DOCUMENTS 6,115,239 A * 9/2000 Kim ........................ 361/681
6,477,871 B1 * 11/2002 Shaw et al. ................... 70/58
6,752,554 B1 * 6/2004 Brittingham ................ 400/693
7,176,987 B2 * 2/2007 Liu ............................ 348/838

FOREIGN PATENT DOCUMENTS

JP 02-149083 A 6/1990
WO WO 02/09976 A1 2/2002

\* cited by examiner

*Primary Examiner*—Thai Tran
*Assistant Examiner*—Nigar Chowdhury
(74) *Attorney, Agent, or Firm*—Sughrue Mion, PLLC

(57) ABSTRACT

An image reproducing device has a post pin that is protrusively provided on a reproducing mechanism built-in box, a first post-pin locking mechanism that locks the post pin at the folding position of the reproducing mechanism built-in box by the folding/developing operation of the box, a second post-pin locking mechanism that responds to the operation of an image display unit to lock the post pin at the developing position of the reproducing mechanism built-in box, an image-display-unit locking mechanism in association with the folding operation of the image display unit to lock the image display unit at the storing position of the unit, and a common lock release actuating mechanism that simultaneously releases the lock of the first post-pin locking mechanism and the lock of the image-display-unit locking mechanism.

7 Claims, 14 Drawing Sheets

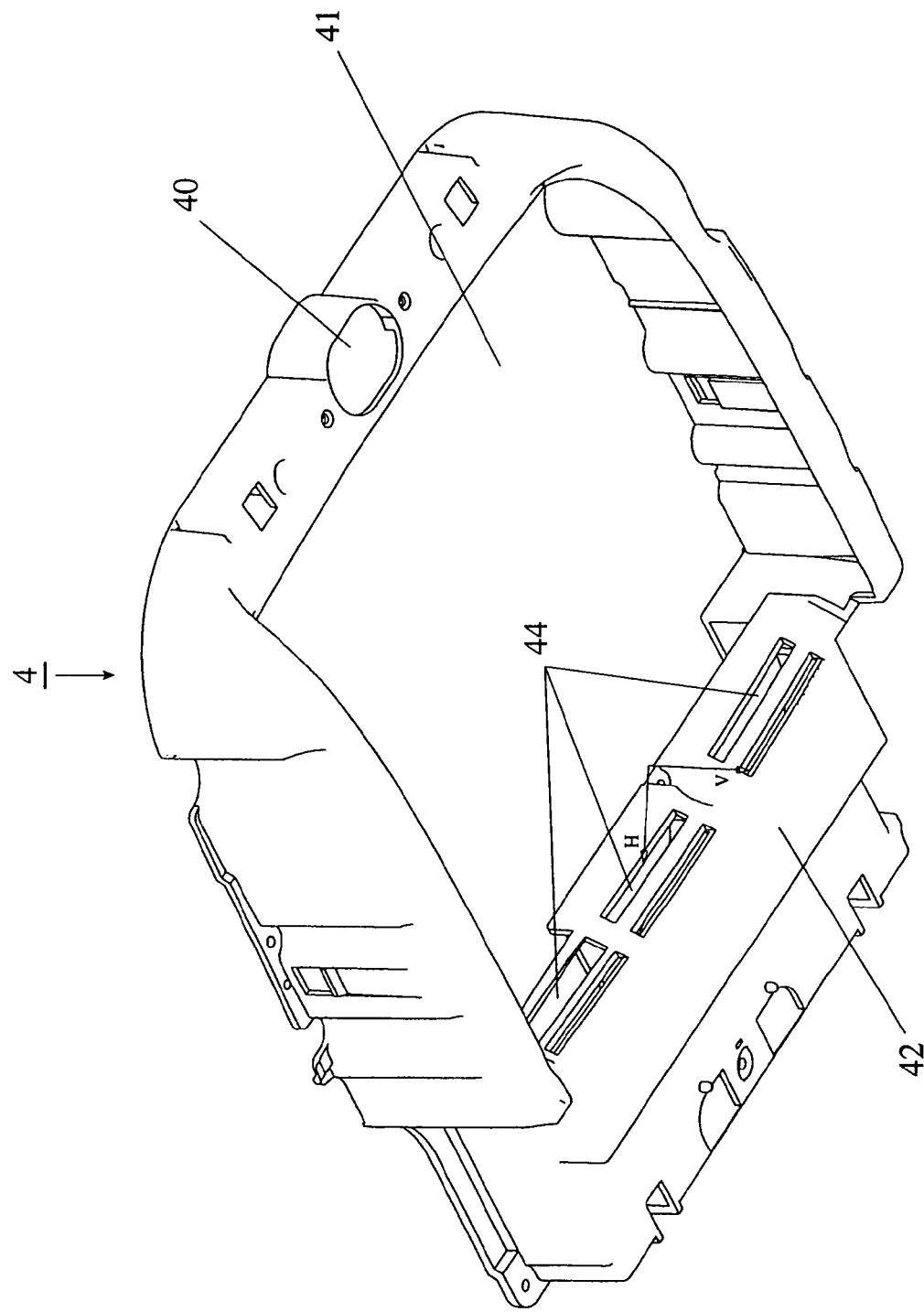

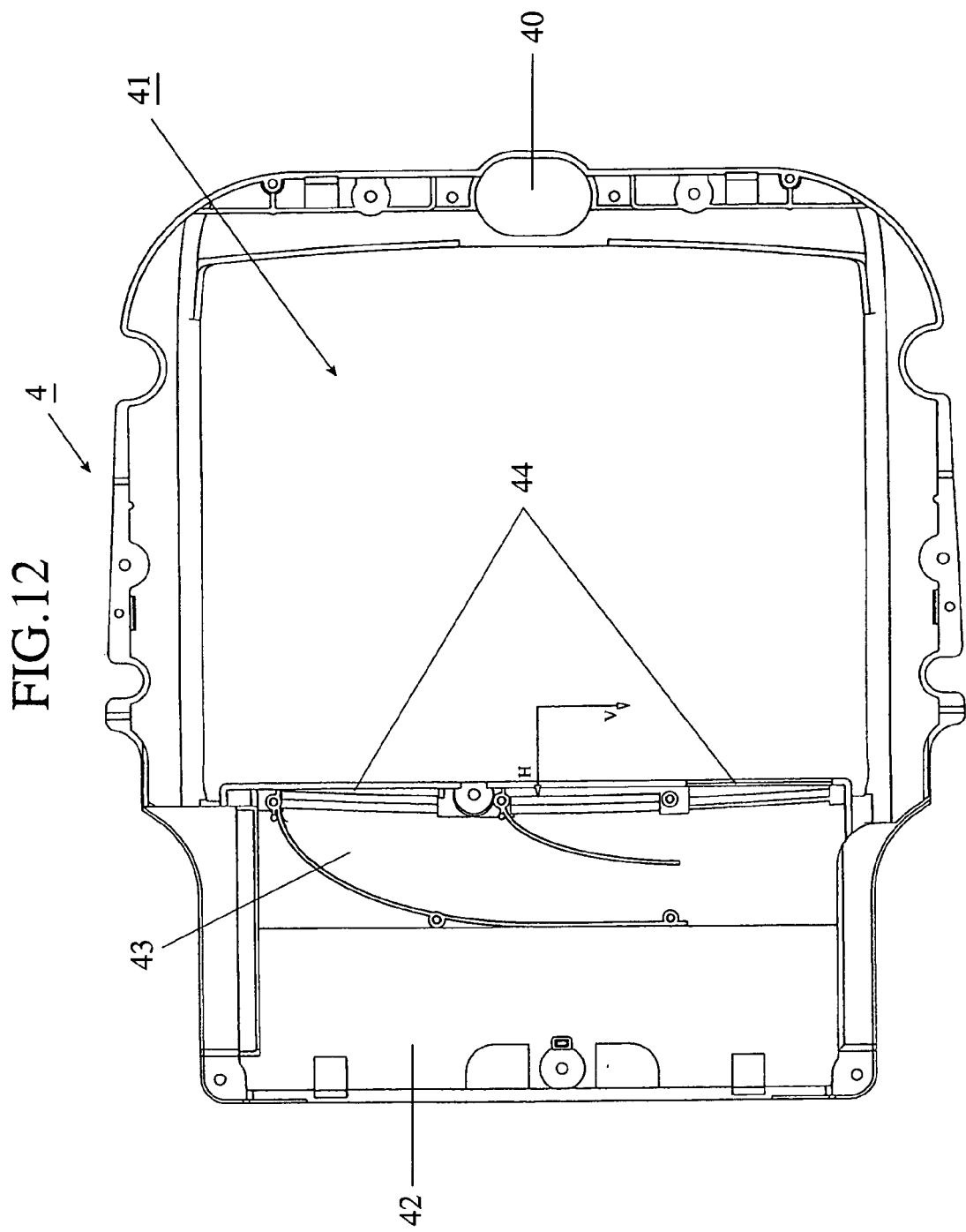

IMAGE REPRODUCING DEVICE

BACKGROUND OF THE INVENTION

1. Field of the Invention

The present invention relates to an image reproducing device secured to the ceiling surface of the room of a mobile unit such as a vehicle to reproduce and display image information.

2. Description of the Related Art

As this type of the image reproducing device, for example, WO 02/09976 A1 (FIG. 3 and FIG. 4) discloses an image reproducing device including a display monitor (image display unit) and a reproducing unit such as a DVD player; these display monitor and reproducing unit are rotatably supported by a common rotating shaft in the folding/developing direction with respect to a chassis; the chassis is secured on the ceiling surface of the vehicle room; when using the device, the display monitor is downwardly opened, responsively followed by the reproducing unit to be opened to a position where a disk-inserting inlet comes to a DVD-insertable slanted angle, whereas when not using the device, the display monitor is rotated to be folded against the chassis side, thus sandwiching the reproducing unit between a top cover bonded over the chassis, and the display monitor through cushion members provided on the upper and lower portions of the reproducing unit. Then, only the display monitor can be locked at the position where the reproducing unit is sandwiched.

Since the conventional image reproducing device is arranged as mentioned above, there is the following problem. In the state where the reproducing unit is sandwiched between the top cover of the chassis and the display monitor and only the display monitor is locked when the device is not used, the cushion member is interposed not only between the reproducing unit and the top cover, but also between the reproducing unit and the display monitor. In such a manner, the reproducing unit and display monitor can resist weak shocks and vibrations while the vehicle is moving. However, when the reproducing unit and display monitor receive a strong vibration, they cannot resist the vibration, to thereby be shaken.

More specifically, there is provided a leaf spring that soft-locks (temporarily holds) the reproducing unit at the position where the unit is folded and stored on the common rotating shaft supporting the reproducing unit and the display monitor, and there is provided a shallow engaging concavity in which the leaf spring engages in the vicinity of the rotating shaft on the side of the reproducing unit. The leaf spring elastically engages in this engaging concavity, thereby holding the reproducing unit at the folding/storing position. Moreover, the locking mechanism of the display monitor is arranged as follows: a claw-engaging concavity is provided on the two sides of the display monitor; a lever-shaped opening-and-closing locking claw, which engages in the claw-engaging concavity, is rotatably pivoted on the chassis; and the opening-and-closing locking claw is energized by a spring member in the direction where the claw engages the claw-engaging concavity. Here, in order for the display monitor to be locked or held by the opening-and-closing locking claw at the position at which the monitor thrusts the cushion members, the claw-engaging concavity is formed so as to have a sideward-opened concave shape of size so that an idle space will be formed under the opening-and-closing locking claw engaging the inner surface of the upper end of the concavity.

Accordingly, when the above-described conventional image reproducing device receives a strong impact or vibration while the vehicle is moving in the state in which the reproducing unit and the display monitor are folded or stored and locked, the display monitor violently vibrates up and down within the idle space of the claw-engaging concavity. This results in the detachment of the leaf spring from the shallow engaging concavity, thereby violently vibrating the reproducing unit up and down. The reproducing unit and the display monitor held at the folding/storing position can uncontrollably descend by their own weight. Thus, there is a problem that the image reproducing device cannot have sufficient vibration resistance.

SUMMARY OF THE INVENTION

The present invention has been accomplished to solve the above-mentioned problem. An object of the present invention is to provide an image reproducing device that can ensure sufficient vibration resistance because a reproducing unit and a display monitor therein can be positively locked and held at the folding/storing position of the unit and the monitor even if the device receives a strong impact or vibration while the vehicle is moving.

Another object of the present invention is to provide an image reproducing device in which the electromagnetic shielding of its reproducing unit can be improved.

Still another object of the present invention is to provide an image reproducing device in which the cooling efficiency of its reproducing unit can be improved.

An image reproducing device according to one aspect of the present invention includes: a chassis that is secured on the ceiling surface of a mobile unit; an image display unit that is rotatably secured to this chassis in the folding/developing direction with respect to the chassis through a rotating shaft; a reproducing mechanism built-in box that has a disk-inserting inlet and a built-in reproducing mechanism of an information storage medium, is supported by the rotating shaft, and can be rotated in the folding/developing direction with respect to the chassis between the chassis and the image display unit; a first post-pin locking means for mechanically locking a post pin, which is protrusively provided on the side of the reproducing mechanism built-in box, at the developing-use position of the box in association with the folding/developing operation of the image display unit; an image-display-unit locking means for mechanically locking the image display unit at the folding/storing position of the unit in association with the folding/storing operation of the image display unit; and a lock release actuating mechanism that causes the image-display-unit locking means to perform a lock-releasing operation.

According to the aspect of the present invention, because the image reproducing device is arranged as mentioned above, simply causing the image display unit and the reproducing mechanism built-in box to perform the folding operation or the developing operation enables the image display unit and the reproducing mechanism built-in box to be strongly locked or held in an automatic-mechanical manner at the developing-use position of the image display unit, and at the folding/storing position of the reproducing mechanism built-in box, respectively.

Furthermore, the image reproducing device according to another aspect of the present invention may be arranged to include: a second post-pin locking means for mechanically locking a post pin, which is protrusively provided on the side of the reproducing mechanism built-in box, at the folding/storing position of the box in association with the folding/developing operation of the reproducing mechanism built-in box; and a common lock release actuating mechanism that causes the second post-pin locking means and the image-display-unit locking means to simultaneously perform a lock-releasing operation. As a result, according to the aspect of the present invention, simply causing the image display unit and the reproducing mechanism built-in box to perform the folding operation or the developing operation enables the image display unit and the reproducing mechanism built-in box to be strongly locked or held in an automatic-mechanical manner at their respective folding/storing positions. Accordingly, this can eliminate the uncontrollable vibration or descending rotation of the reproducing mechanism built-in box and the image display unit placed in the folding/storing state, which are caused by the influence of the violent shock and vibration of a mobile unit such as a vehicle. Thereby, the image reproducing device can obtain high vibration resistance with high reliability.

Moreover, the image reproducing device according to another aspect of the present invention can be arranged such that the reproducing mechanism built-in box is made of a sheet metal box. As a result, according to the aspect of the present invention, the reproducing mechanism housed in the reproducing mechanism built-in box can be efficiently electromagnetically shielded, thereby greatly improving the electromagnetic shielding characteristics of the mechanism.

Furthermore, the image reproducing device according to still another aspect of the present invention can be arranged such that the image reproducing device has a fan that is secured at the rear end of the reproducing mechanism built-in box, and ventilates the inside of the box; and a cover member that has a window hole permitting the rotation of the image display unit and the reproducing mechanism built-in box, and is secured on the chassis; and in the cover member is provided an air passage that exhausts the air taken in by the fan to the outside. As a result, according to the aspect of the present invention, the heat generated in the reproducing mechanism built-in box can be exhausted to the outside with the fan. Therefore, the inside of the reproducing mechanism built-in box can be efficiently cooled.

BRIEF DESCRIPTION OF THE DRAWINGS

FIG. 11 is an appearance perspective view of the cover member of the image reproducing device according to the first embodiment 1 of the present invention;

FIG. 12 is a backside view of the cover member shown in FIG. 11;

DETAILED DESCRIPTION OF THE PREFERRED EMBODIMENTS

An embodiment of the present invention will be described below.

First Embodiment

Figure 1:
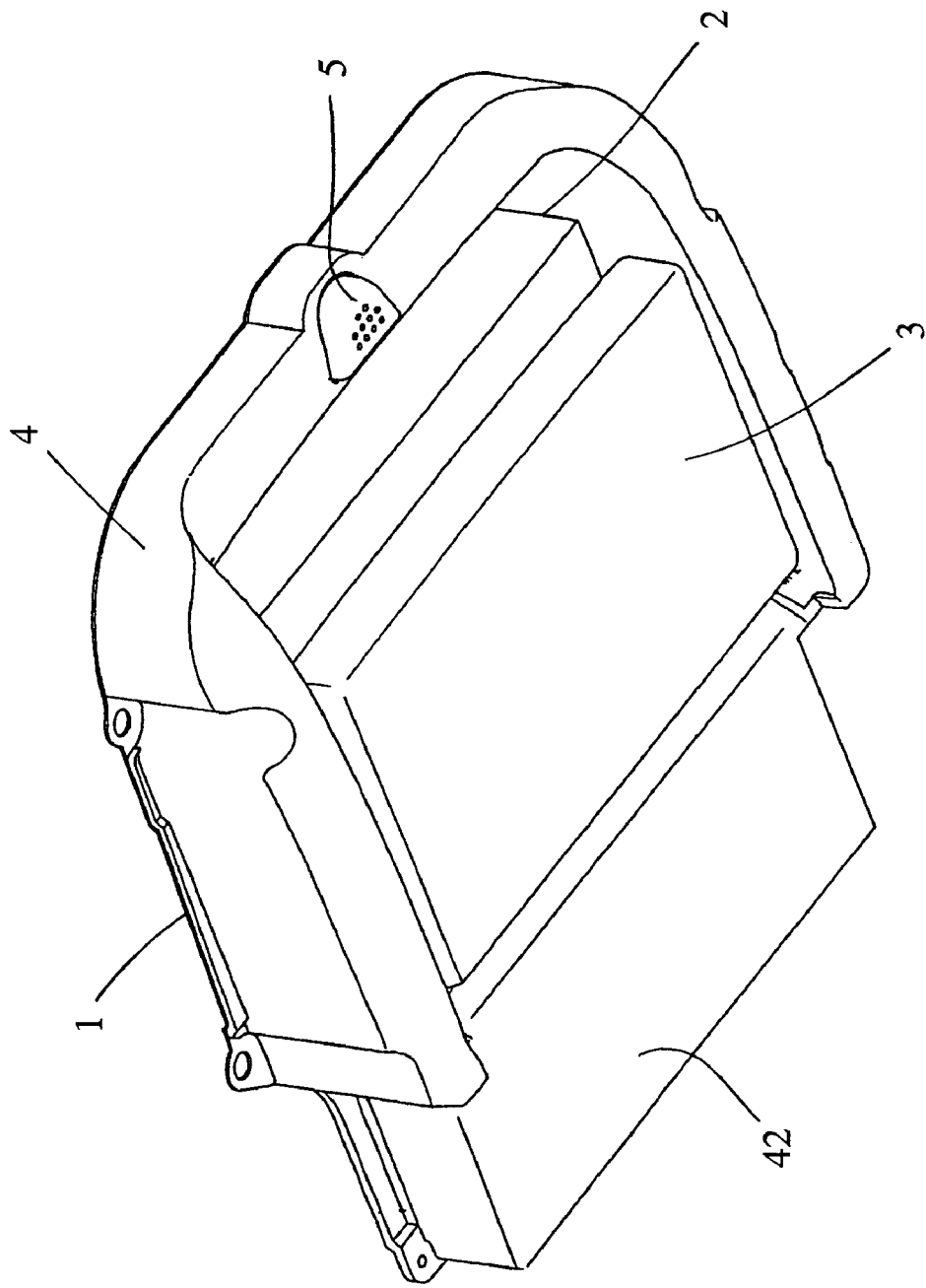
FIG. 1 is an appearance perspective view showing the folding state of an image reproducing device in accordance with a first embodiment of the present invention.
Figure 2:
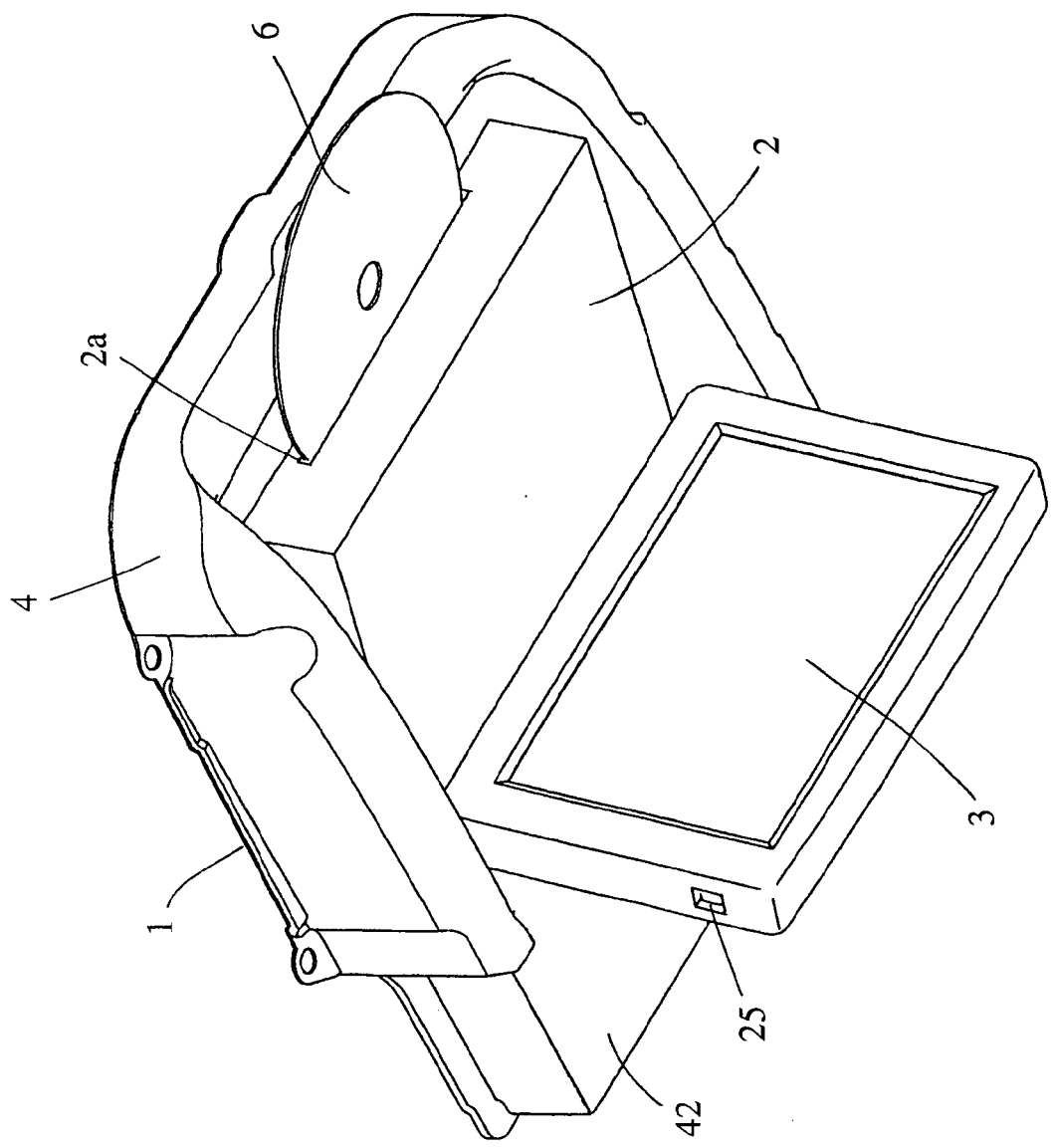
FIG. 2 is an appearance perspective view showing the open-developing state of the image reproducing device in FIG. 1.

FIG. 1 is an appearance perspective view of the state in which an image reproducing device according to a first embodiment of the present invention is folded. FIG. 2 is an appearance perspective view of the state in which the image reproducing device shown in FIG. 1 is opened and developed.

The image reproducing device according to the first embodiment can be arranged such that a reproducing mechanism built-in box 2 having a built-in reproducing mechanism such as a DVD player, a display monitor (image display unit) 3, and a cover member 4 are assembled to a plate-shaped chassis 1 secured on the ceiling surface of the room of mobile units such as a variety of vehicles or ships. The reproducing mechanism built-in box 2 and the display monitor 3 are arranged to be locked at the folded and stored position shown in FIG. 1. The locking mechanism therefor will be described later. The reproducing mechanism built-in box 2 and the display monitor 3 are arranged to descend by their own weight by pushing a push button 5 for releasing the locking at the folding and storing state as shown in FIG. 1, and then be held at the developing-use position at which the box and the monitor are opened at respective predetermined angles. At the developing-use position, the disk-inserting inlet 2a of the reproducing mechanism built-in box 2 is arranged such that the inlet 2a can be opened at a predetermined angle, and a disk 6 which is an information storage medium such as a DVD can be inserted from the inlet 2a.

Figure 3:
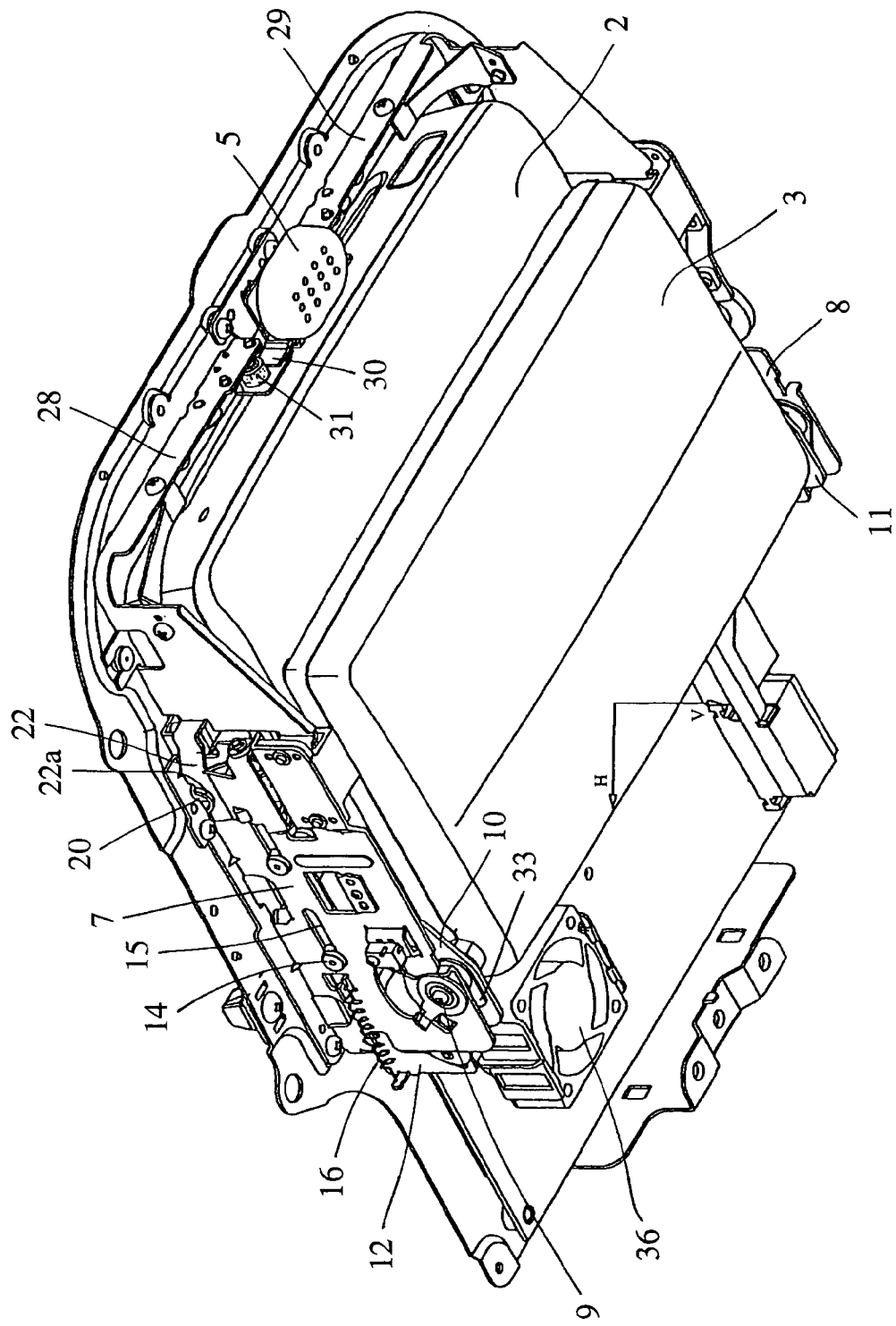
FIG. 3 is a perspective view showing the state removing a cover member of the image reproducing device in FIG. 1.
Figure 4:
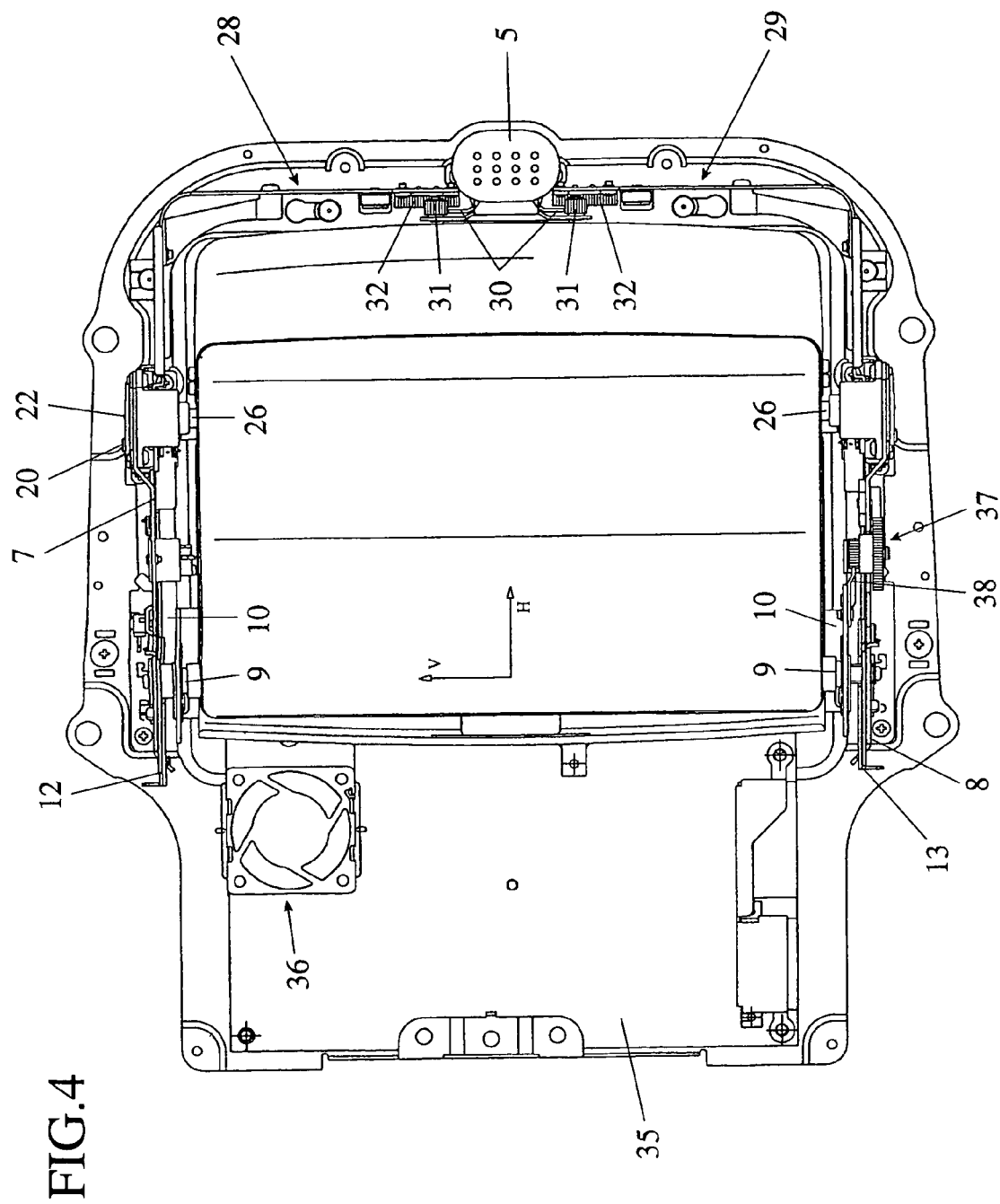
FIG. 4 is a top view of the image reproducing device in FIG. 3.
Figure 5:
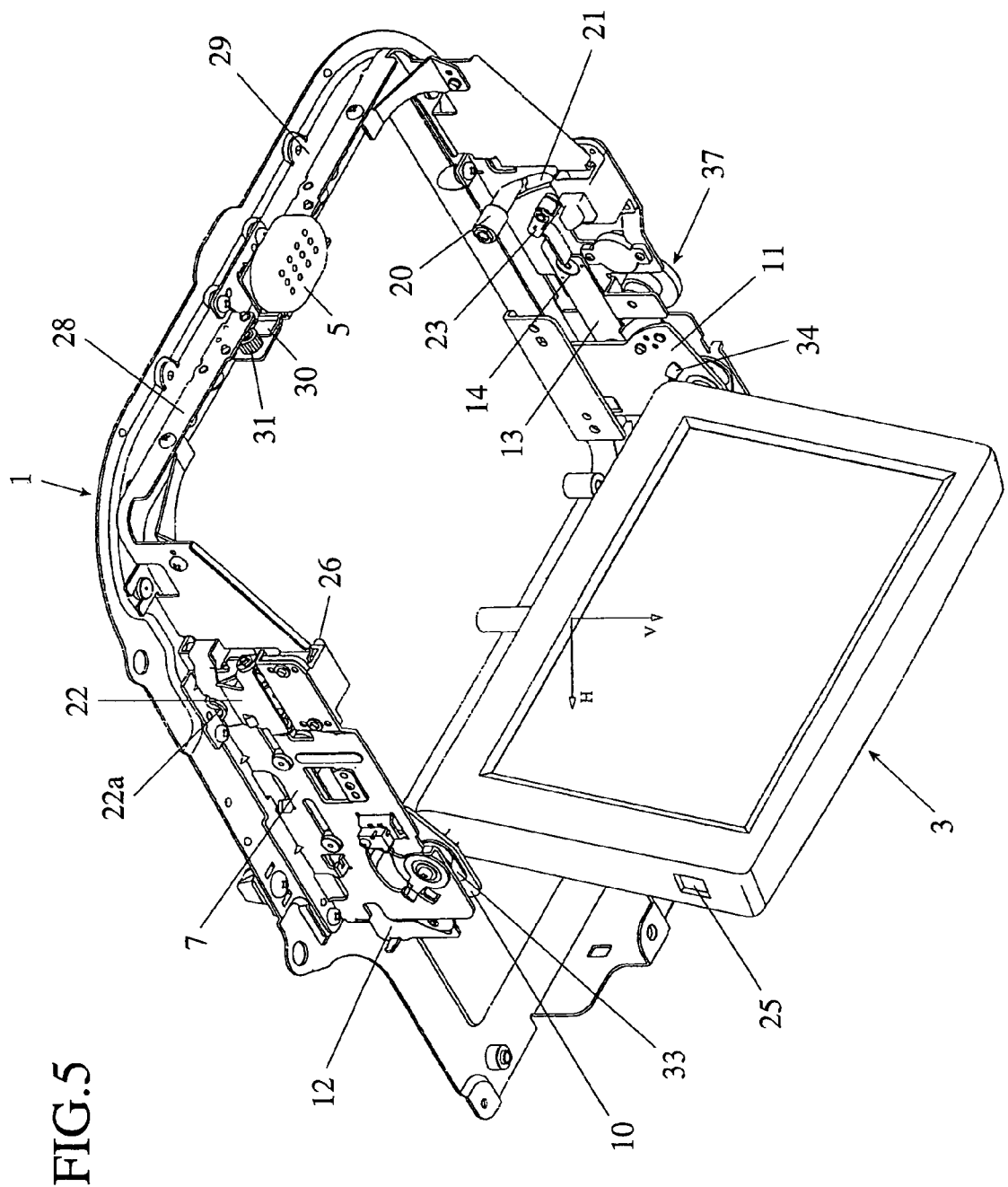
FIG. 5 is a perspective view showing the state removing a reproducing mechanism built-inbox upon opening a display monitor.
Figure 6:
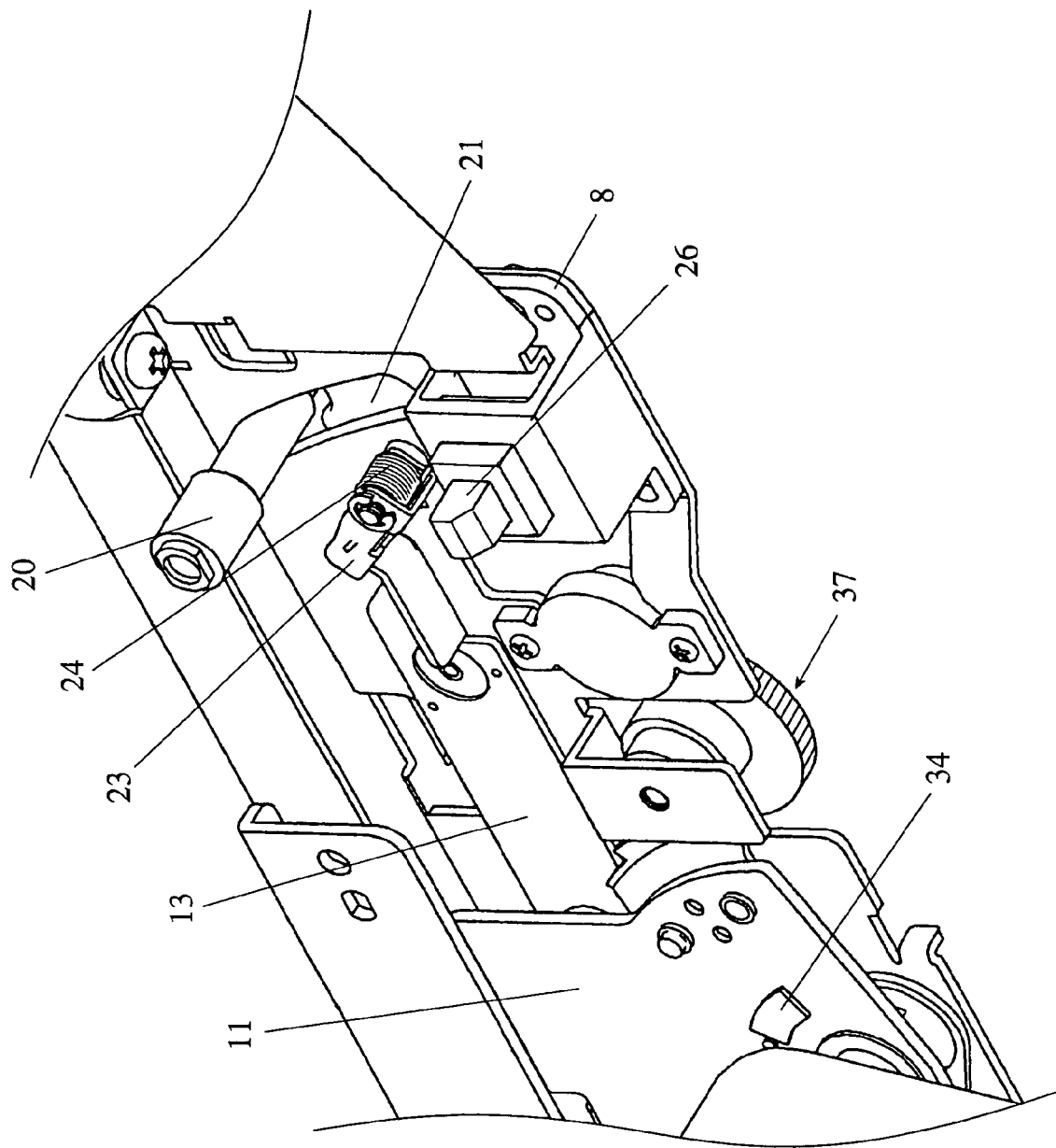
FIG. 6 is an expanded perspective view in the vicinity of the post pin in FIG. 5.
Figure 7:
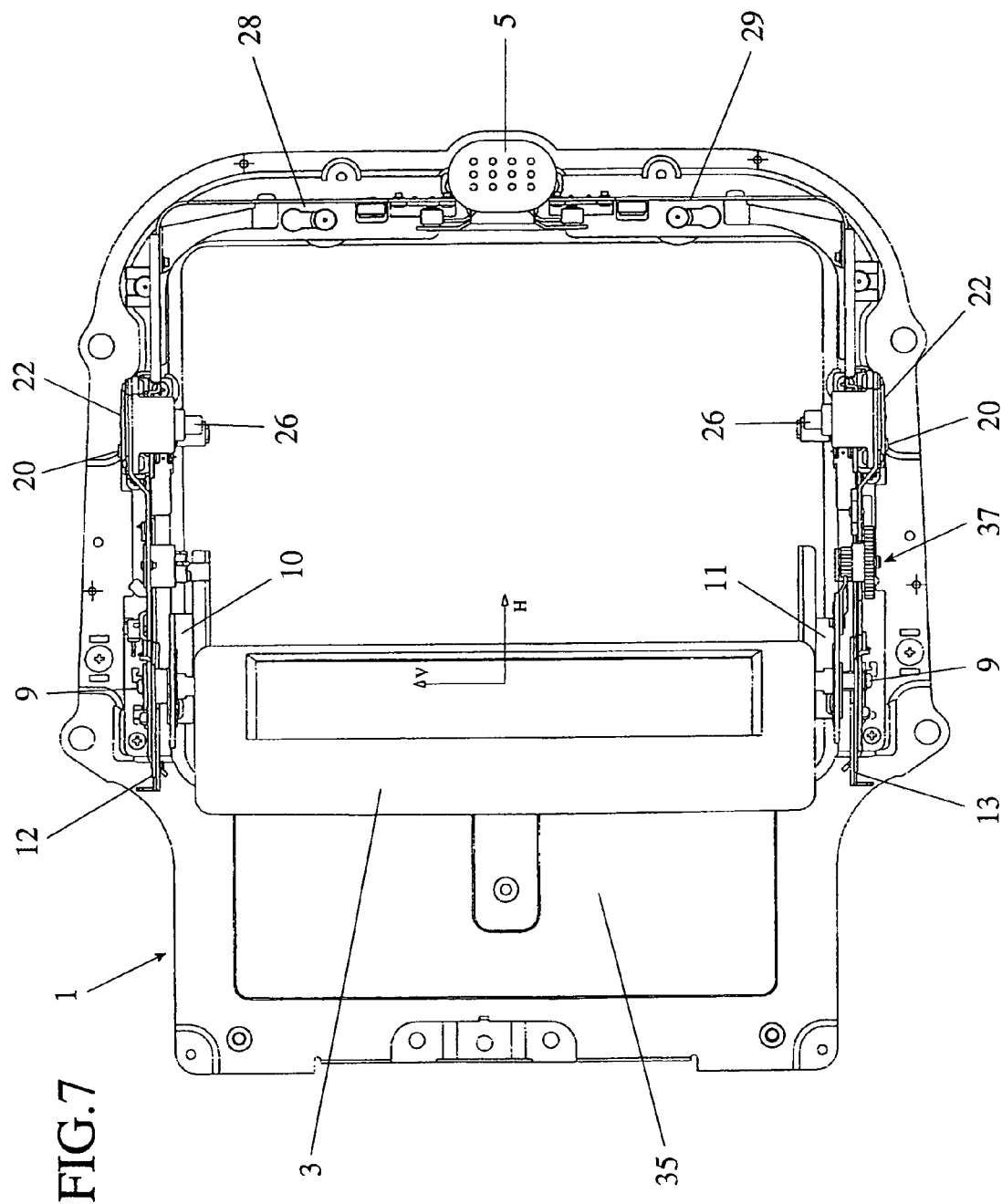
FIG. 7 is a top view of FIG. 5.
Figure 8:
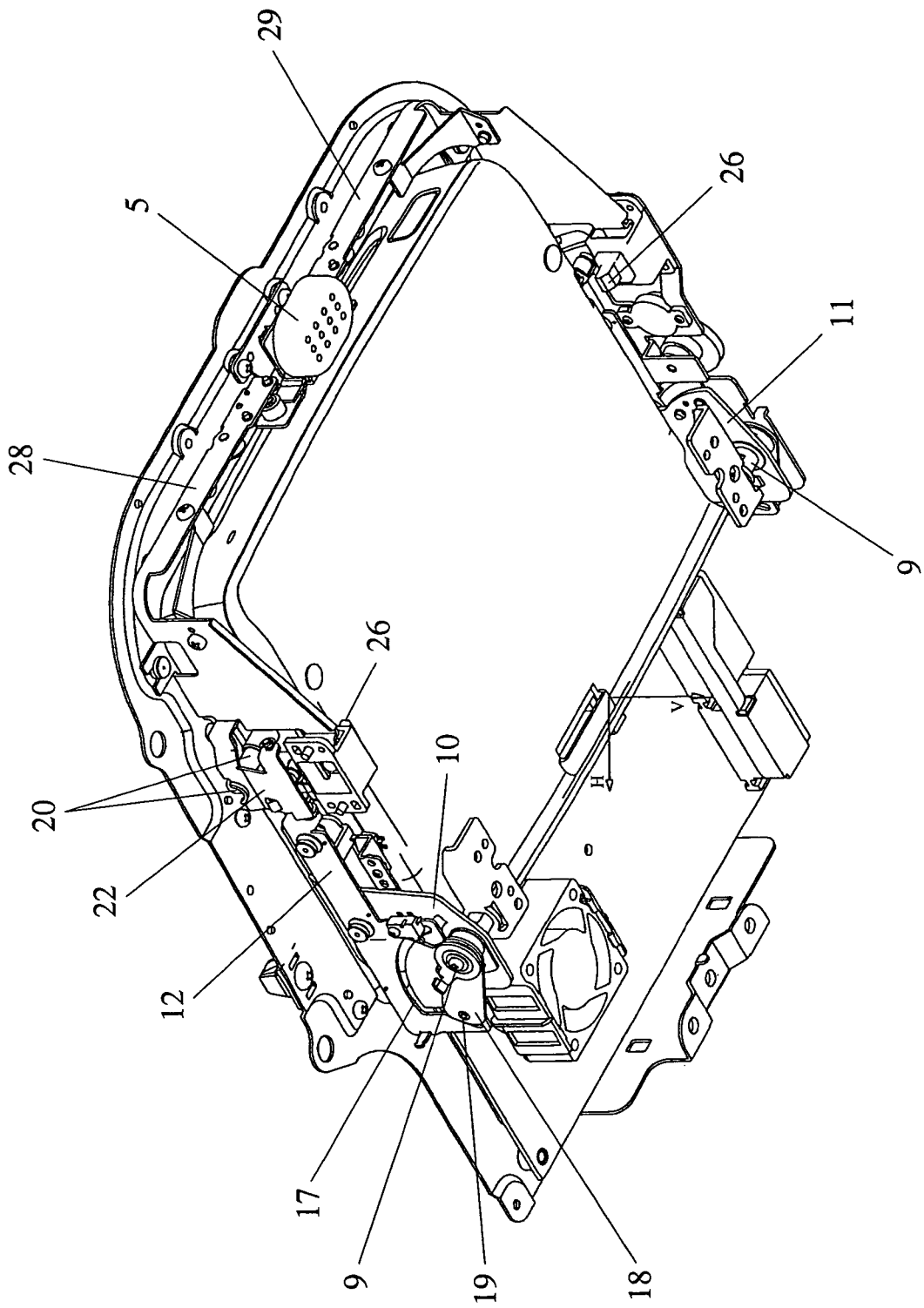
FIG. 8 is a perspective view of the state in which in the image reproducing device shown in FIG. 3, a display monitor and a fixing bracket on the side of a chassis are omitted, and a reproducing mechanism built-in box is closed.
Figure 9:
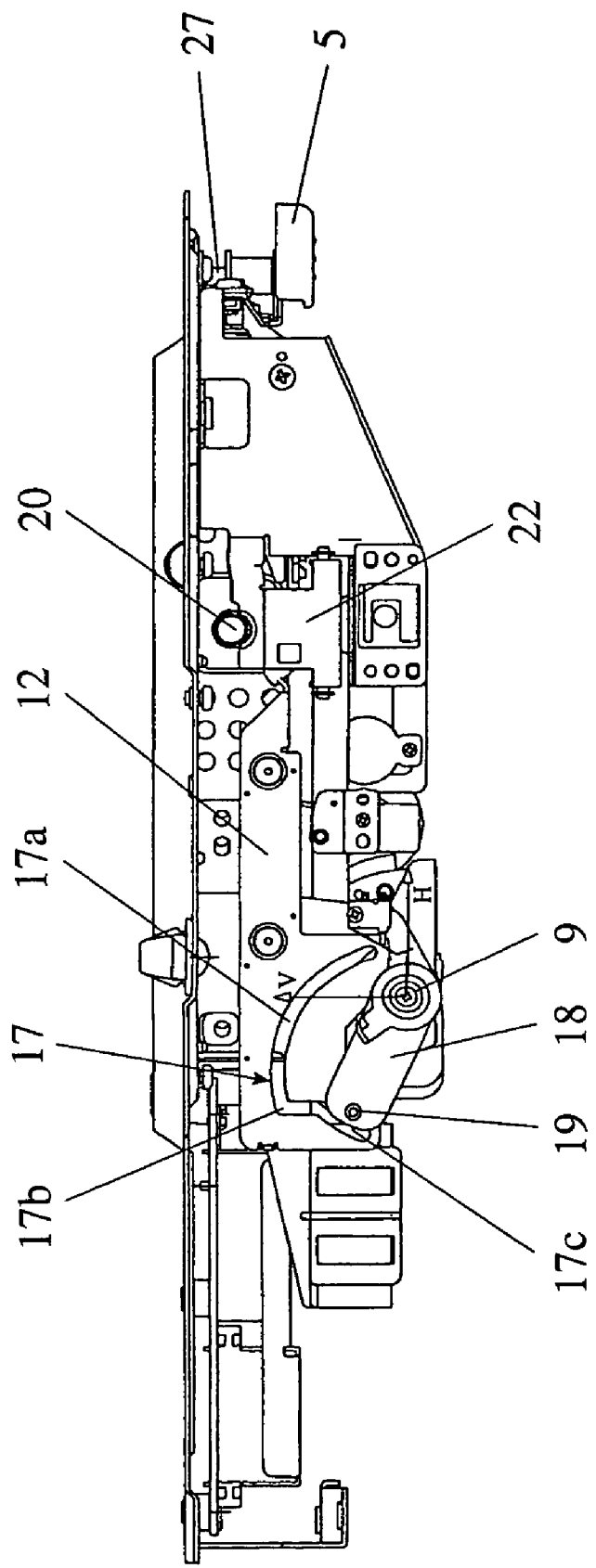
FIG. 9 is a side elevation view of the image reproducing device shown in FIG. 8.
Figure 10:
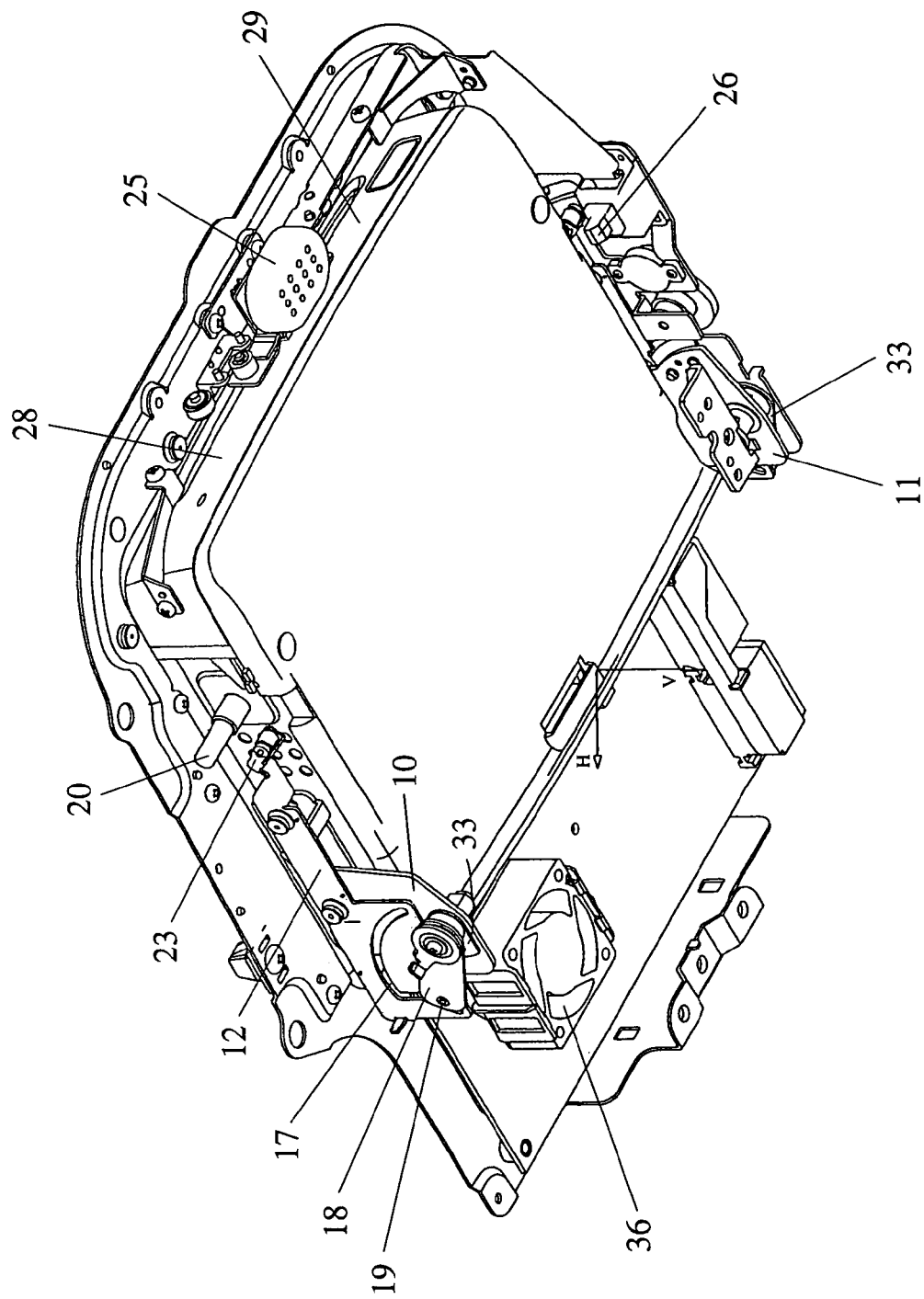
FIG. 10 is a perspective view of the state in which in the image reproducing device shown in FIG. 8, a post-pin suppressing member is omitted.

FIG. 3 is a perspective view of the state in which the image reproducing device shown in FIG. 1 is stripped of its cover member. FIG. 4 is a top view of the image reproducing device in FIG. 3. FIG. 5 is a perspective view of the state in which in the image reproducing device of FIG. 3, its display monitor is opened, and its reproducing mechanism built-in box is omitted. FIG. 6 is an expanded perspective view of the vicinity of the post pin of the image reproducing device shown in FIG. 5. FIG. 7 is a top view of the image reproducing device in FIG. 5. FIG. 8 is a perspective view of the state in which in the image reproducing device of FIG. 3, its display monitor and its fixing bracket on the side of its chassis are omitted, and its reproducing mechanism built-in box is closed. FIG. 9 is a side elevation view of the image reproducing device shown in FIG. 8. FIG. 10 is a perspective view of the state in which in the image reproducing device shown in FIG. 8, its post-pin suppressing member is omitted.

As shown from FIG. 3 to FIG. 6, the chassis 1 can integrally have a pair of right and left fixing brackets 7, 8 that are suspended in the state in which the image reproducing device is secured on the ceiling surface of the room of the mobile unit. In the first embodiment, the fixing brackets 7, 8 are removably fastened to the chassis 1 with screws. The fixing brackets 7, 8 are arranged to rotatably support the reproducing mechanism built-in box 2 and the display monitor 3 in the folding/developing direction in which the box 2 and the monitor 3 on a common rotating shaft 9.

The structure of the supporting mechanism will be described in detail hereinbelow. The rotating shaft 9 is provided at the back of the display monitor 3, and can rotate integrally with the monitor 3. The rotating shaft 9 projects from each side of the rear of the display monitor 3 and can be rotatably supported by the fixing brackets 7, 8. Meanwhile, on each side of the rear of the reproducing mechanism built-in box 2, box-supporting brackets 10, 11 for supporting the box 2 at the rotating shaft 9 are integrally provided. These box-supporting brackets 10, 11 extend to the side of the rotating shaft 9 between the two sides of the reproducing mechanism built-inbox 2 which is disposed between the chassis 1 and the display monitor 3, and the fixing brackets 7, 8, and are rotatably secured to the rotating shaft 9. Therefore, the display monitor 3 and the reproducing mechanism built-in box 2 are rotatably supported on the rotating shaft 9, which is common to the monitor and the box, in the folding/developing direction.

The display monitor 3 and the reproducing mechanism built-in box 2 thus supported are individually locked at their respective folding/storing positions. The locking mechanism therefor is described later.

Slide levers 12, 13 of the lock system in association with the rotation of the display monitor 3 and then move backward and forward are secured on the internal side of the fixing brackets 7, 8 located on the side of the chassis 1. The securing of the slide levers can be carried out in the following manner. Two guide pins 14 are protrusively provided on each of the fixing brackets 7, 8. These guide pins 14 are slidably engaged through guiding long holes 15 provided in the fixing brackets 7, 8. Thus, the slide levers 12, 13 are secured slidably to the fixing brackets 7, 8 in the backward and forward direction. As shown in FIG. 3 and FIG. 5, these slide levers 12, 13 are forwardly energized by each of pulling springs 16 (energizing mechanism) which are provided and tensioned between the slide levers 12, 13 and the fixing brackets 7, 8.

As shown from FIG. 8 to FIG. 10, a guide hole 17 is provided at the rear of the slide levers 12, 13. This structure allows the slide levers 12, 13 to be interlocked with the display monitor 3 through this guide hole 17. As the interlocking mechanism, a rotating lever 18 is perpendicularly integrally connected to the rotating shaft 9, and a lever pin 19 protrusively provided on the top side of the rotating lever 18 is slidably engaged in the guide hole 17.

The shape of the guide hole 17 will now be described as below. As shown in FIG. 9, this guide hole 17 can be composed of: a curved hole portion 17a that curves in the direction along the moving track of the lever pin 19 about the rotating shaft 9; a straight hole portion 17b that is connected to the rear end of this curved hole portion 17a, and extends in the direction in which the hole portion 17b approaches the rotating shaft 9; and an escaping hole portion 17c that is connected to the lower end of this straight hole portion 17b, extends in the direction opposite to the curved hole portion 17a, and curves in the direction along the moving track of the lever pin 19.

The slide levers 12, 13 formed with the guide hole 17 having such a shape are held at the retreating position against the energizing force of the pulling spring 16 in the state where the lever pin 19 is engaged in the escaping hole portion 17c constituting the rear of the guide hole 17 at the position where the reproducing mechanism built-in box 2 and the display monitor 3 are folded and stored. When the reproducing mechanism built-in box 2 and the display monitor 3 rotate downward by their weight from this state, the lever pin 19 projecting from the tip of the rotating lever 18, which integrally rotates with the rotating shaft 9, engages the straight hole portion 17b of the guide hole 17, and then pushes forwardly the slide levers 12, 13. Further, the lever pin 19 moves to the curved hole portion 17a while forwardly moving the slide levers 12, 13 by the energizing force of the pulling spring 16 acting on the slide levers 12, 13, to be engaged at the front end of the curved hole portion 17a. In such a way, the display monitor 3 can be maintained in the state where the monitor is opened at a predetermined angle (the maximum inclined opening degree). Accordingly, the guide holes 17 of the slide levers 12, 13 can also serve as the rotation-restricting mechanism (means) that restricts the rotation range of the display monitor 3.

Meanwhile, a post pin 20 (see FIG. 3, and FIGS. 5-7) located forward of and separated from the box-supporting brackets 10, 11 at the rear of the box 2 are protrusively provided on the two sides of the reproducing mechanism built-in box 2. The post pin 20 is slidably engaged in the pin guiding hole 21 provided at the position corresponding to the post pin 20 of the fixing brackets 7, 8, piercing through the pin guiding hole 21, and projecting outwardly from the fixing brackets 7, 8. The pin guiding hole 21 curves in the direction along the movement track of the post pin 20 that integrally moves with the reproducing mechanism built-in box 2 when the reproducing mechanism built-in box 2 rotates about the rotating shaft 9, extending in an upper and lower direction. When the post pin 20 engages at the lower end of the pin guiding hole 21, the reproducing mechanism built-in box 2 is arranged to be held in the state opened at a predetermined angle. Moreover, the post pin 20 is arranged to engage at the upper end of the pin guiding hole 21 at the position where the reproducing mechanism built-in box 2 is folded and stored. Therefore, the post pin 20 and the pin guiding hole 21 can serve as the rotation-range restricting mechanism that restricts the rotation range of the reproducing mechanism built-in box 2.

The locking mechanism (means) that locks the reproducing mechanism built-in box 2 at the folding/storing position of the box will now be described as below.

First of all, as a second post-pin locking mechanism (means) that locks the reproducing mechanism built-in box 2 at the folding/storing position, a post-pin suppressing member 22 (see FIGS. 3-5 and FIG. 8) at the position covering the pin guiding hole 21 is rotatably pivoted in the engaging and disengaging direction with/from the external surface of the fixing brackets 7, 8 outside the fixing brackets 7, 8. The post-pin suppressing member 22 has the energizing force acting in the direction in which the tip of the post-pin suppressing member 22 is caused to abut on the external surface of each of the fixing brackets 7, 8. Moreover, a concave engaging portion 22a having a semicircular-arc shape is formed at the tip of the post-pin suppressing member 22, and the post pin 20 engaged at the upper end of the pin guiding hole 21 is fit in the concave engaging portion 22a to be held down.

The related configuration between the post pin 20 and the post-pin suppressing member 22 will now be described as below. At the position where the reproducing mechanism built-in box 2 is developed, the post-pin suppressing member 22 abuts the tip of the post pin 20 by the energizing force. When the reproducing mechanism built-in box 2 is rotated in the folding direction, the tip of the post pin 20 moves while outwardly forcing and broadening the post-pin suppressing member 22 against the energizing force, and at the time when the post pin 20 engages at the upper end of the pin guiding hole 21, the post pin 20 passes the concave engaging portion 22a of the post-pin suppressing member 22. Thus, the post-pin suppressing member 22 rotates by its energizing force, and the concave engaging portion 22a engages with the post pin 20 to thereby hold down the post pin 20. This can lock the reproducing mechanism built-inbox 2. Accordingly, the post-pin suppressing member 22 can serve as the second post-pin locking mechanism that responds to the folding rotation of the reproducing mechanism built-in box 2, and thereby locks the reproducing mechanism built-in box 2 at the position where the box is folded and stored.

The first post-pin locking mechanism that locks the reproducing mechanism built-in box 2 at the rotating and developing position will now be described as below.

In the proximity of the pin guiding hole 21 located inside the fixing bracket 7, 8, as shown in FIG. 5 and FIG. 6, are pivotally supported a post-pin locking claw 23 that can freely rotate in the direction where the claw blocks the pin guiding hole 21 and escapes from the pin guiding hole 21. This post-pin locking claw 23 is energized in the direction in which the claw gets out of the pin guiding hole 21 by a coiled spring 24 provided around the pivoting portion to thereby abut at the front end of each of the slide levers 12, 13. When the post pin 20 does not engage the lower end of the pin guiding hole 21, this post-pin locking claw 23 can be arranged to be maintained in the deformed state by the energizing force of the coiled spring 24 at the shunting position at which the claw is separated from the pin guiding hole 21. When the post pin 20 engages at the lower end of the pin guiding hole 21 at the front end of the slide levers 12, 13 that forward moves in association with the rotation of the display monitor 3 in the developing direction of the monitor, the post-pin locking claw 23 can be arranged to rotate in the direction against the energizing force of the coiled spring 24 to thereby block the pin guiding hole 21, and to hold down the post pin 20 engaging at the lower end of the pin guiding hole 21, thereby locking the display monitor. Therefore, the post-pin locking claw 23 can serve as the first post-pin locking mechanism (means) that mechanically locks the post pin 20 at the developing-use position of the reproducing mechanism built-in box 2.

The mechanism of locking the display monitor 3 will now be described as below.

On each side of the display monitor 3 close to its front edge, can be provided a lock hole 25 (see FIG. 2). Further, in each of the fixing brackets 7, 8, can be provided a lock pin 26 (see FIG. 4 to FIG. 8) serving as an image-display-unit locking mechanism (means) that fits and engages in the lock hole 25 at the folding/storing position of the display monitor 3. The lock pin 26 can have a back pressure energizing force exerted in the direction in which the pin engage the lock hole 25, and have a taper surface at the lower portion of the top end. When the display monitor 3 is folded and rotated, this lock pin 26 can be pushed on the taper surface of the top end of the lock pin 26 by each side of this display monitor 3, and can thereby backward move against the back pressure energizing force. At the folding/storing position of the display monitor 3, it can be arranged that the lock hole 25 oppose the top end of the lock pin 26, and thereby the lock pin 26 forward move by the back pressure energizing force to fit and engage in the lock hole 25. Accordingly, the lock hole 25 and the lock pin 26 can serve as a locking mechanism in association with the folding/storing operation of the display monitor 3, and thereby locks the display monitor 3 at the folding/storing position.

The lock-releasing mechanism of the reproducing mechanism built-in box 2 and the display monitor 3 will now be described as below.

A push button 5 for the release of the lock is vertically movably fixed in the center of the underside of the top end of the chassis 1. This push button 5 is energized in the downward direction by a spring 27 shown in FIG. 9. This push button 5 can be interlocked by the post-pin suppressing member 22 and the lock pin 26 through lock-releasing levers 28, 29. Therefore, the push button 5 and the lock-releasing levers 28, 29 can constitute a common lock-releasing operation mechanism that causes the post-pin suppressing member 22, which is the second post-pin locking mechanism, and the lock pin 26, which is the image-display-unit locking mechanism, simultaneously operate in the direction in which the lock is released.

The configuration in which the push button 5 interlocks with the lock-releasing levers 28, 29 will now be described as below. The push button 5 can have a gear plate 30 (see FIG. 4) that integrally vertically moves with the button. This gear plate 30 has a teeth portion 30a provided at each end of the plate. A pinion gear 31 meshing with the teeth portion 30a of the gear plate 30 is rotatably pivoted at a predetermined position on the side of the chassis 1. Further, a rack gear 32 meshing with the pinion gear 31 is provided on each of the lock-releasing levers 28, 29.

Accordingly, when the push button 5 is pushed against the energizing force of the spring 27, the pinion gear 31 meshing with the teeth portion 30a of the gear plate 30 integrally moving with the push button 5 can rotate. The torque thereof can be transmitted to each of the lock-releasing levers 28, 29 through the rack gear 32. This can cause the lock-releasing levers 28, 29 to move in the opposite (expanding) direction. Thereby, it is intended that the lock pin 26 moves in the direction in which the lock pin retreats from the lock hole 25 against the back pressure energizing force, and that the post-pin suppressing member 22 moves in the direction where the lock of the post pin 20 is released against the energizing force of the coiled spring 24.

In the above configuration, to the rotating shaft 9 can be connected leaf springs 33 (see FIG. 8 and FIG. 10) that slidably contact the sides of the box-supporting brackets 10, 11, and integrally rotate with the rotating shaft 9. An engaging protrusion (not shown) that slidably contacts the box-supporting brackets 10, 11 is formed in each of this leaf springs 33. Moreover, an engaging concavity 34 that is elastically engaged with the engaging protrusion at the position where the display monitor 3 is generally vertically developed is provided in each of the box-supporting brackets 10, 11. This enables the soft locking holding of the display monitor 3 by use of the weak force of the leaf spring 33 even if the display monitor assumes a generally vertical developing position.

Meanwhile, a circuit board 35 can be secured at a rearward position of the reproducing mechanism built-in box 2 on the underside of the rear of the chassis 1. Further, a fan 36 having an air inlet communicating with the inside of the reproducing mechanism built-in box 2 is secured at the rear end of the reproducing mechanism built-in box 2. This fan 36 can remove the heat generated in the reproducing mechanism built-in box 2, and discharge the heat to the outside, thereby cooling the inside of the reproducing mechanism built-in box 2. The air outlet of the fan 36 can be opened in the opposite direction to the circuit board 35. In addition, a decelerating gear mechanism 37 is provided in one of the fixing brackets 8 on the side of the chassis 1 (see FIG. 4). The decelerating gear mechanism 37 has a small-diameter-teethed gear which meshes with a gear plate 38 provided in one of the box-supporting brackets 11. Thereby, the display monitor 3 can be gradually descendingly rotated at the time of lock-releasing.

FIG. 11 is an appearance perspective view of the cover member of the image reproducing device according to the first embodiment of the present invention. FIG. 12 is a backside view of the cover member shown in FIG. 11.

The cover member 4, which is attached to the chassis 1, can be monolithically formed, with resin material, in a frame that has a push-button inserting hole 40, a window opening 41, which permits the folding and developing operation of the reproducing mechanism built-inbox 2 and the display monitor 3, and a box-shaped covering housing 42, which covers and houses the circuit board 35 and the fan 36. Moreover, an air passage 43 communicating with the air outlet of the fan 36 and exhausting the hot air is provided in the covering housing 42 at the rear of the cover member 4. An exhaust slot 44 exhausting the hot air from the air passage 43 is provided in the covering housing 42.

Thus, the reproducing mechanism built-in box 2 can be arranged such that the heat generated within the box is removed and forced to be discharged outside by the fan 36, which can efficiently cool the reproducing mechanism built within the reproducing mechanism built-in box 2.

Figure 13A:
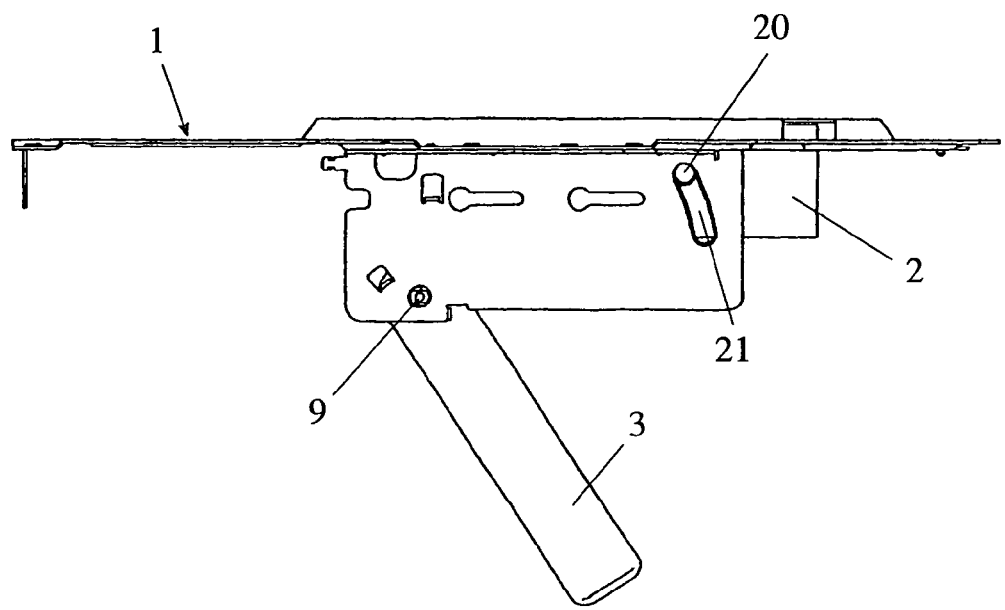
FIGS. 13A and 13B are explanatory views of the operation of the image reproducing device according to the first embodiment of the present invention.
Figure 13B:
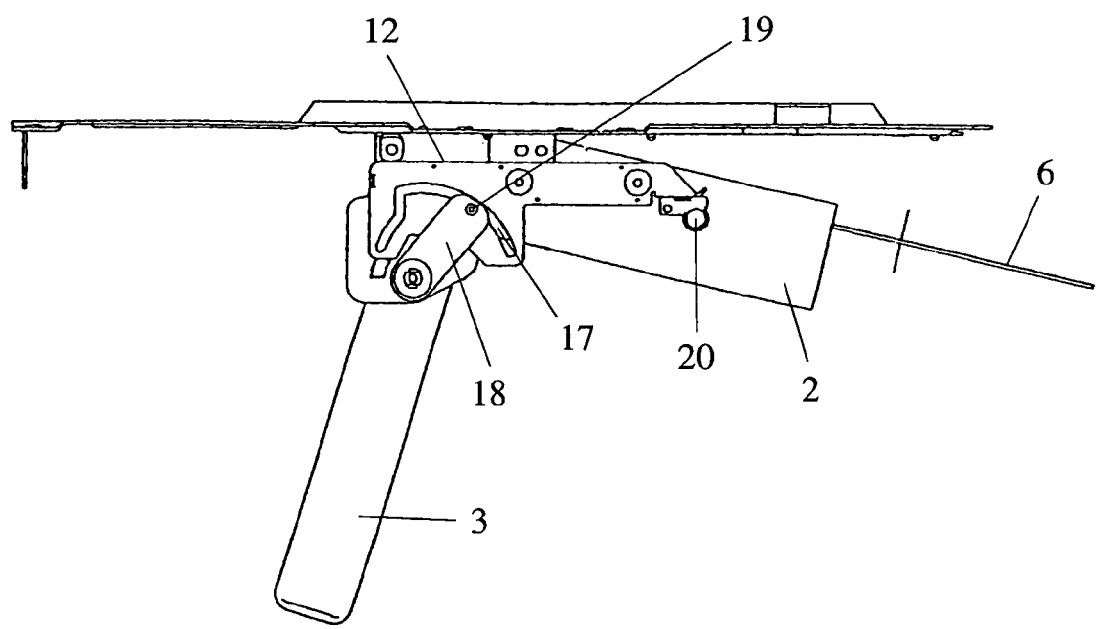
Figure 14A:
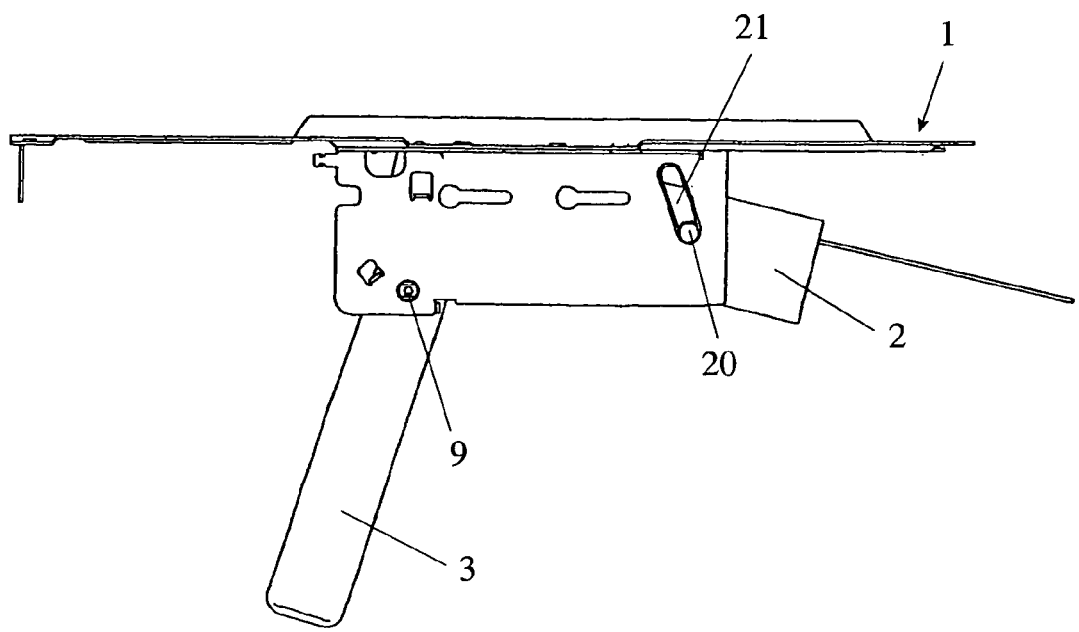
FIGS. 14A and 14B are explanatory views of the operation of the image reproducing device in accordance with the first embodiment of the present invention.
Figure 14B:
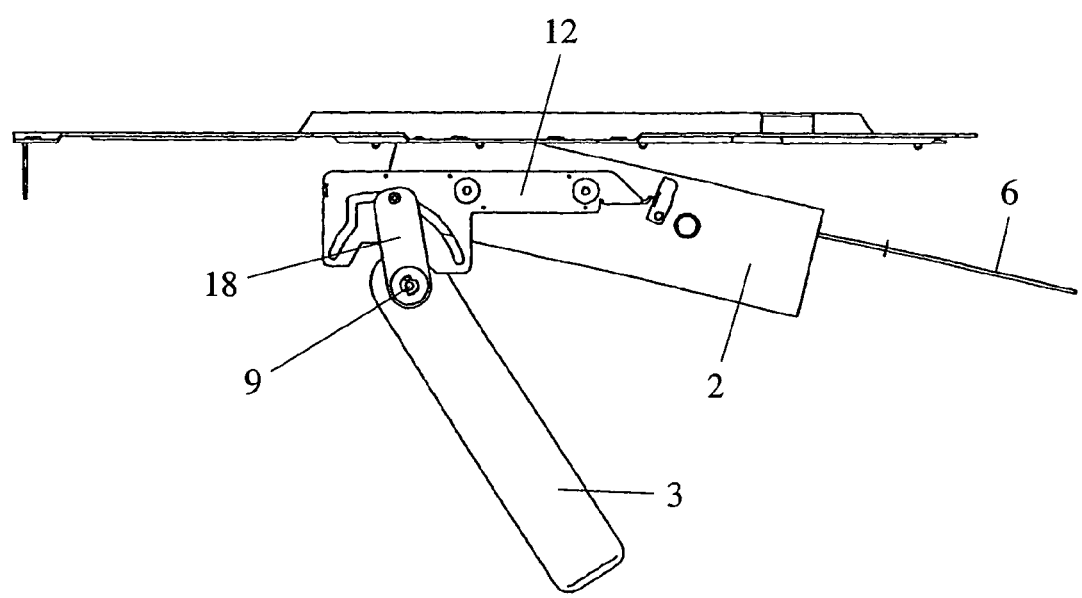

The operation of the image reproducing device will now be described as below. FIG. 13 and FIG. 14 are explanatory views of the operation of the device.

In the state where the reproducing mechanism built-in box 2 and the display monitor 3 are each locked and held at the position at which the box and the monitor are folded and stored, when the push button 5 is pushed, the gear plate 30, which operates responsively to this action, can cause the pinion gear 31 to rotate. Thereby, the lock-releasing levers 28, 29 can move in the opposite direction through the medium of the rack gear 32 that meshes with this pinion gear 31. In such a way, the post-pin suppressing member 22 can rotate in the direction where the lock of the post pin 20 is released, and simultaneously the lock pin 26 can backward move in the direction in which the lock pin retreats from the lock hole 25. When the reproducing mechanism built-in box 2 and the display monitor 3 are thereby unlocked, first of all, the display monitor 3 can descendingly rotate by its own weight on the rotating shaft 9 to a predetermined angle, and responding to this rotation, the reproducing mechanism built-in box 2 can similarly descendingly rotate by its weight on the rotating shaft 9. At that time, the reproducing mechanism built-in box 2 can descend by its weight to the position at which the post pin 20 engages the lower end of the pin guiding hole 21. Here, when the post pin 20 engages at the lower end of the pin guiding hole 21, the display monitor 3 has not been developed to the using position of the monitor, but the monitor can be held in the state in which the monitor halts on the way.

When the display monitor 3 is manually opened from the halting state to the position at which the monitor can be used, the lever pin 19 of the rotating lever 18 can push and move the slide levers 12, 13 in the direction in which the levers advance. This advancement of the slide levers 12, 13 can thrust and rotate the post-pin locking claw 23 by using the tips of the levers in the direction resisting the energizing force of the coiled spring 24. Thereby, the post-pin locking claw 23 can hold down and thereby lock the post pin 20 that is engaged at the lower end of the pin guiding hole 21, at the lower end of the pin guiding hole 21. Therefore, the reproducing mechanism built-in box 2 can be mechanically strongly locked and held at the position at which the box is developed and used at a predetermined angle at which the disk-inserting inlet 2a is obliquely downwardly opened, thereby improving the earth-quake resistance of the image reproducing device. Meanwhile, the display monitor 3 can be held at the position of being intermediately developed in a generally vertical direction by the engagement of the leaf spring 33 in the engaging concavity 34 of each of the box-supporting brackets 10, 11, or can be held at the position of being developed at the maximum angle by the engagement of the lever pin 19 with the front end of the curved hole portion 17a of each of the slide levers 12, 13.

When folding and rotating the display monitor 3 from the state in which the reproducing mechanism built-in box 2 and the display monitor 3 are thus developed, the lever pin 19 of the rotating lever 18, which integrally rotates with the rotating shaft 9 in the folding direction, can cause the slide levers 12, 13 to retreat in the direction resisting the energizing force of the pulling spring 16. Following the retreat of the slide levers 12, 13, the post-pin locking claw 23 can rotate in the direction of getting away from the pin guiding hole 21 by the energizing force of the coiled spring 24. This can release the lock of the post pin 20. Subsequently, when continuing to rotate the display monitor 3 to the position of being folded and stored, the display monitor 3 can push the reproducing mechanism built-in box 2 in the direction of being folded, thereby enabling the post pin 20 to upwardly move along the pin guiding hole 21. At the time of the ascending movement, the tip of the post pin 20 can broaden the post-pin suppressing member 22 against the energizing force. When the post pin 20 passes the concave engaging portion 22a located at the tip of the post-pin suppressing member 22, and then engaged the upper end of the pin guiding hole 21, the post-pin suppressing member 22 can rotate in the direction of engaging the post pin 20, by its own energizing force, and thereby the concave engaging portion 22a can fit over the post pin 20. Thereby, the reproducing mechanism built-in box 2 can be mechanically strongly locked and held at the position of being folded and stored by the post-pin suppressing member 22. When the display monitor 3 is, simultaneously with this, folded and rotated to the position of being stored, the lock pin 26 can fit or engage in the lock hole 25 provided on each side of the display monitor 3, which can lock and hold the display monitor 3.

As described, according to the first embodiment, the rotating shaft 9 located on the rear end side of the display monitor 3 is arranged to rotatably support the rear end side of the reproducing mechanism built-in box 2, which is disposed between the chassis 1 and the display monitor 3, through the box-supporting brackets 10, 11. As a result, the display monitor 3 and the reproducing mechanism built-in box 2 can be descendingly rotated in this order by their respective weight with the rotating shaft 9 as center. Accordingly, the reproducing mechanism built-in box 2 can be strongly locked and held at the position of being folded and stored for the following reason. It can be arranged that the post pins 20 be protrusively provided at the positions forward of and separated from the rotating shaft 9, one on each side of the reproducing mechanism built-in box 2; these lock pins 20 be each outwardly projected slidably through the pin guiding hole 21 provided in each of the fixing brackets 7, 8 on the side of the chassis 1; when the reproducing mechanism built-in box 2 is rotated in the direction of being folded and developed, the tip of the post pin 20, which moves along the pin guiding hole 21, cause the post-pin suppressing member 22 to rotate against the energizing force exerted in the direction where the suppressing member is caused to abut on the external surface of each of the fixing brackets 7, 8; and when the post pin 20 passes the tip (free end) of the post-pin suppressing member 22 in the ascending direction, the post pin 20 engages at the upper end of the pin guiding hole 21. As a result, when the post pin 20 engages at the upper end of the pin guiding hole 21, the post-pin suppressing member 22 can be rotated by the energizing force, thereby mechanically locking the post pin 20. For this reason, the reproducing mechanism built-in box 2 can be strongly locked and held at the position at which the box is folded and stored.

Moreover, as described above, according to the first embodiment, the display monitor 3 can be also mechanically locked by the lock pin 26 at the position where the monitor 3 is folded and stored. In addition, simply pushing the push button 5 can simultaneously perform the release of the lock of the post pin 20 by the post-pin suppressing member 22 and the release of the lock of the display monitor 3 by lock pin 26. Furthermore, the post pin 20, which has engaged at the lower end of the pin guiding hole 21 because the reproducing mechanism built-inbox 2 descended by its own weight after the locks of the post pin 20 and of the display monitor 3 were released, can be mechanically locked by rotating the display monitor 3 to the position of being developed and used. This is because the post pin 20 can be locked by the post-pin locking claw 23 rotated by each of the tips of the slide levers 12, 13, which advance responding to this rotating movement of the display monitor. Further, the decelerating gear mechanism 37 can cause the reproducing mechanism built-in box 2 to gradually descend by its own weight.

What is claimed is:

1. An image reproducing device comprising:
   a chassis that is secured on the ceiling surface of a mobile unit;
   an image display unit that is rotatably secured to this chassis in the folding/developing direction with respect to the chassis through a rotating shaft;
   a reproducing mechanism built-in box that has a disk-inserting inlet and a built-in reproducing mechanism of an information storage medium, is supported by the rotating shaft, and can be rotated in the folding/developing direction with respect to the chassis between the chassis and the image display unit;
   a first post-pin locking means for mechanically locking a post pin which is protrusively provided on the side of the reproducing mechanism built-in box, at the developing-use position in association with the folding/developing operation of the image display unit;
   an image-display-unit locking means for mechanically locking the image display unit at the folding/developing position in association with the folding/storing operations of the image display unit;
   a lock release actuating mechanism that causes the image-display-unit locking means to perform a lock-releasing operation;
   a second post-pin locking means for mechanically locking a post pin which is protrusively provided on the side of the reproducing mechanism built-in box at the folding/developing position in association with the folding/developing operation of the reproducing mechanism built-in box; and
   a common lock release actuating mechanism that causes the second post-pin locking mechanism and the image-display-unit locking means to simultaneously perform a lock-releasing operation.

2. The image reproducing device according to claim 1, wherein the reproducing mechanism built-in box is made of a sheet metal box.

3. The image reproducing device according to claim 1, further comprising:
   a fan that is secured at the rear end of the reproducing mechanism built-in box, and ventilates the inside of the box; and
   a cover member that has a window hole permitting the rotation of the image display unit and the reproducing mechanism built-in box, and is secured on the chassis, wherein an air passage that exhausts the air taken in by the fan to the outside is prepared in the cover member.

4. The image reproducing device according to claim 1, wherein the rotation of the image display unit induces movement in the first post-pin locking means so as to mechanically lock the post pin.

5. An image reproducing device comprising:
   a chassis configured to be secured on the ceiling surface of a mobile unit;
   an image display unit that is rotatably secured to the chassis so as to rotate between a folded position and a display position with respect to the chassis via a rotating shaft;
   a reproducing mechanism built-in box that has a disk-inserting inlet and a built-in reproducing mechanism of an information storage medium which is supported by the rotating shaft and can be rotated in a folding direction and a developing direction with respect to the chassis between the chassis and the image display unit;
   a first post-pin locking member which mechanically locks a post pin which is protrusively provided on the side of the reproducing mechanism built-in box, at the developing-use position in association with the rotation of the image display unit;
   an image-display-unit locking member which mechanically locks the image display unit in the folded position and the display position;
   a lock release actuating mechanism that causes the image-display-unit locking member to perform a lock-releasing operation;
   a second post-pin locking member which mechanically locks the post pin in association with a rotation of the reproducing mechanism built-in box in the folding direction; and
   a common lock release actuating mechanism that causes the second post-pin locking mechanism and the image-display-unit locking member to simultaneously perform a lock-releasing operation.

6. The image reproducing device according to claim 5, further comprising:
   a fan that is secured at the rear end of the reproducing mechanism built-in box, and ventilates the inside of the box; and
   a cover member that has a window hole permitting the rotation of the image display unit and the reproducing mechanism built-in box, and is secured on the chassis, wherein an air passage that exhausts the air taken in by the fan to the outside is prepared in the cover member.

7. The image reproducing device according to claim 5, wherein the rotation of the image display unit induces movement in the first post-pin locking member so as to mechanically lock the post pin.

* * * * *